(12) United States Patent
Won (10) Patent No.: US 7,828,275 B2
(45) Date of Patent: Nov. 9, 2010

(54) HUMIDIFIER FOR USE WITH HEATED AIR SOURCE

(76) Inventor: Haion Won, 13 Wellington Dr., Basking Ridge, NJ (US) 07920

( * ) Notice: Subject to any disclaimer, the term of this patent is extended or adjusted under 35 U.S.C. 154(b) by 845 days.

(21) Appl. No.: 11/481,168

(22) Filed: Jul. 5, 2006

(65) Prior Publication Data
US 2008/0006953 A1    Jan. 10, 2008

(51) Int. Cl.
*B01F 3/04*    (2006.01)
(52) U.S. Cl. .................. 261/154; 261/104; 261/107; 261/DIG. 41
(58) Field of Classification Search ............ 261/154, 261/101, 104, 107, DIG. 41, DIG. 46, DIG. 65
See application file for complete search history.

(56) References Cited

U.S. PATENT DOCUMENTS

| | | | | |
|---|---|---|---|---|
| 1,894,898 A | * | 1/1933 | Trane | 261/104 |
| 2,091,957 A | * | 9/1937 | Boa | 237/78 R |
| 2,161,834 A | * | 6/1939 | Seeley | 237/78 R |
| 2,236,538 A | * | 4/1941 | Kuenhold | 239/50 |
| 2,242,594 A | * | 5/1941 | Petersen | 261/104 |
| 2,276,135 A | * | 3/1942 | Woolley | 237/78 R |
| 2,323,158 A | * | 6/1943 | Siefken | 239/51.5 |
| 2,377,836 A | * | 6/1945 | Woolery | 261/30 |
| 2,678,235 A | * | 5/1954 | Perlman | 239/44 |
| 2,839,279 A | * | 6/1958 | Harris et al. | 261/104 |
| 2,847,989 A | * | 8/1958 | Powers et al. | 126/113 |
| 2,858,825 A | * | 11/1958 | Skerritt | 126/113 |
| 3,052,416 A | * | 9/1962 | Stephen | 239/44 |
| 4,225,539 A | | 9/1980 | Grants | 261/99 |
| 4,226,174 A | | 10/1980 | Vesper | 454/328 |
| 4,240,991 A | * | 12/1980 | Shaub | 261/92 |
| 4,307,656 A | * | 12/1981 | Vesper | 454/328 |
| RE31,675 E | * | 9/1984 | Vesper | 454/328 |
| 5,093,895 A | | 3/1992 | Ghorayeb | 392/395 |
| 5,324,230 A | | 6/1994 | Hist | 454/328 |
| 6,850,698 B1 | | 2/2005 | Goh | 392/403 |
| 2003/0127753 A1 | * | 7/2003 | Bachert | 261/81 |
| 2004/0217494 A1 | * | 11/2004 | Lee | 261/104 |

* cited by examiner

*Primary Examiner*—Scott Bushey
(74) *Attorney, Agent, or Firm*—Ernest D. Buff & Associates LLC; Ernest D. Buff; Harry Anagnestopoulos (57) ABSTRACT

A humidifier utilizes a plurality of disposable filters and air from a source of heated air flow emanating from a floor, wall, or ceiling. The humidifier provides an energy efficient device comprising a container having a water reservoir formed from an inner support portion, a plurality of tunnels for transporting heated air throughout the container, and a plurality of evaporation filters. The evaporation filters extend into the water reservoir so that water is absorbed onto the filters by way of capillary action. The humidifier is appointed to be placed proximate to a source of heated air so that water absorbed by the evaporation filters evaporates into the heated air and is diffused into a room.

23 Claims, 7 Drawing Sheets

Figure 6

HUMIDIFIER FOR USE WITH HEATED AIR SOURCE

BACKGROUND OF THE INVENTION

1. Field of the Invention

The present invention relates to a humidifier and method of using same that utilizes a plurality of disposable filters and air from a source of heated air flow near a floor, wall, or ceiling; and more particularly, to an energy efficient humidifier appointed for placement proximate to a hot air source, and having a water reservoir and a plurality of filters extending into the water reservoir so that water is absorbed by the filters due to capillary action.

2. Description of the Prior Art

Many enclosed buildings experience low humidity levels, especially during the heating season. Low humidity environments are associated with respiratory problems. Room air should be humidified within a relatively narrow humidity range to achieve an acceptable human comfort level at a particular temperature and atmospheric pressure. Humidifier units are conventionally utilized for delivering moisture to homes and offices to achieve the desired humidity ranges.

The majority of humidifiers have an internal source of heat and a motorized fan that blows air over the hear source and through or against a moistened filter or wick. However, the use of an internal heat source and fan requires these devices to be powered by electricity, and many have irritating humming or other noises the user must bear through. Many of these devices further require replacement of the filters, which tend to be costly. In addition, the internal heat source and fan add substantially to the cost, size, and weight of the humidifier.

Other humidifiers currently available involve energy efficient devices that do not have an internal heat source or fan and do not require electricity; instead these energy efficient humidifiers generally involve a container having a water reservoir appointed to be placed in proximate association with heater units. Delivery of moisture to the air is achieved though evaporation of the water reservoir. For example, U.S. Pat. No. 5,093,895 to Ghorayeb discloses a humidifier appointed for attachment to a base-board heater unit. The humidifier includes a container for storing water and an opening for evaporation. As hot air from the heater unit passes over the water and evaporates same, the moistened air is forced into the room. The device cannot be utilized with both wall and floor heater units. It utilizes direct evaporation of the water reservoir into the room, causing frequent refilling of the water reservoir.

While other energy efficient humidifiers do not involve evaporation directly form a water reservoir, but instead involve evaporation of water from a material wick wetted through capillary migration. For example, U.S. Pat. No. 4,225,539 to Grants discloses a room humidifier unit operable in conjunction with the natural circulation of the room's air, comprising a portable, self-contained and angularly adjustable evaporator having water absorbent evaporative strips disposed therein to obtain maximum evaporation of moisture into the room's circulating air. The device is a stand-alone unit, and evaporation is achieved from the room's air circulation.

In addition, capillary migration is utilized for various humidifiers appointed to be placed in close proximity to a heating source. Many of these humidifiers include a single material surface for absorbing water, and utilize placement of the wetted material over the heating source vent. For example, U.S. Pat. No. 6,850,698 to Goh discloses a free-standing humidifier appointed for placement above a floor heating source. The humidifier has a main reservoir for holding water and receiving an end of a paper towel while the other end is received by a rod appointed so that water wicks the paper-towel through capillary migration and hot air passes over the moist towel. U.S. Pat. No. 5,324,230 to Hist discloses a portable wall register mount humidifier having a water reservoir with a wicking material vertically suspended therein so that the water is absorbed on the material by way of capillary action and forced are traverses the material. These humidifiers only include a single material surface and a small reservoir area. As a result, water is absorbed at a fast rate from the single towel or material so that it frequently become dry; while at the same time, the reservoir needs frequent refilling.

Even where humidifiers utilize a plurality of material wicks arranged in relation to one another, these units fail to provide optimum moisture delivery, while at the same time providing a unit that does not have to be filled frequently. For example, U.S. Pat. No. 4,226,174 to Vesper discloses a humidifier appointed for attachment to a wall hot air register via hooks, and is comprised of a substantially rectilinear container having a water reservoir in the base thereof and parallel spaced grooves for removably supporting a plurality of evaporator plates of absorbent material in parallel spaced apart relation to each other. Refilling of the reservoir can be cumbersome as refilling of the unit appears to take place from the back thereof, so that the unit must be removed from the wall for re-filling. In addition, changing or replacement of the evaporator plates can be quite cumbersome, as the plate have a generally L-shape and insertion into the container is achieved though a back opening that can only accommodate a portion of the plate at one time, so that the plate must be awkwardly angled into the container. Disadvantageously, air is delivered over the plates and over the water reservoir area simultaneously, so that evaporation takes place both from the plates and from the reservoir itself. As a result, the reservoir itself would tend to evaporate quickly and need frequent refilling.

Notwithstanding the efforts of prior art workers to construct an energy efficient humidifier for residential and/or commercial use there remains a need in the art for a humidifier for use with a source of heated air and method of using same that is non-complex and space and energy efficient, and which houses a plurality of evaporation filters in parallel arrangement, so that air from an air source in a floor or wall heating source passes thereover. In addition, there is a need in the art for a humidifier that provides a plurality of tunnels between each evaporation filter, so that the tunnels facilitate flow of hot air from the heating source over each of the evaporation filters. Further, there is an art-recognized need for a humidifier wherein indirect air flow over the water reservoir is provided so as to mitigation direct evaporation therefrom and decrease the need and frequency of refilling the reservoir.

SUMMARY OF THE INVENTION

The present invention provides an energy efficient humidifier for residential and/or commercial use and method of using same, that is non-complex and space and energy efficient, and which houses a plurality of evaporation filters in parallel arrangement, so that air from an air source in a floor or wall heating source passes thereover. The humidifier offers an energy efficient construction that does not require a power source. A plurality of tunnels provided between each evaporation filter facilitate flow of hot air from the heating source over each of the evaporation filters. These tunnels afford indirect air flow over the water reservoir so that direct evaporation from the water reservoir is mitigated, and the need and frequency of refilling the reservoir is decreased.

In one embodiment the humidifier comprises a container having a front wall, back wall, bottom, top, and side walls, arranged to form an interior compartment. The container is appointed to be placed in close association with a source of heated air appointed to expel heated air into a room. An inner support portion is fixedly attached to the bottom of the container. The inner support portion is arranged to form a plurality of tunnels and support chambers. The plurality of tunnels extend from the bottom into the interior compartment of container so that heated air from the source enters the tunnels and traverses into the interior compartment of the container. The inner support portion is arranged within the container to form a water reservoir appointed to receive and house water. A plurality of grooves are arranged in a parallel arrangement located on each of the front and back walls of the container. Each of the grooves is arranged in association with each of the support chambers of the inner support portion.

A plurality of evaporation filters are provided. Each of the evaporation filters is adapted to be received by each of the grooves and each of the support chambers of the inner support portion. The plurality of evaporation filters is arranged in a parallel arrangement. Each of the evaporation filters is in intimate contact with the water in the water reservoir so that each of the evaporation filters absorbs moister and becomes wetted through capillary migration. Wherein the bottom of the container, appointed with the tunnels of the inner support portion, is placed in close proximity to the source of heated air so that the heated air flows into the tunnels and traverses the body of each of the evaporation filters that has been wetted and receives moisture therefrom. The moistened air is expelled into the room causing diffusion of moisture therewithin.

In another embodiment, the humidifier comprises a container having a front wall, back wall, bottom, top, and side walls, arranged to form an interior compartment. The container is placed in close association with a source of heated air adapted to expel heated air into a room. An inner support portion is fixedly attached to the bottom of the container and is arranged to form a plurality of support chambers extending from the bottom into the interior compartment of the container. A plurality of tunnels extend from the interior compartment of the container into the room. The inner support portion is arranged within the container to form a water reservoir adapted to receive and house water. A plurality of grooves is arranged in a parallel arrangement located on at least one of each of the front and/or back walls. Each of the grooves is in association with each of the support chambers of the inner support portion. A plurality of evaporation filters is provided. Each of the evaporation filters is received by each of the grooves and each of the support chambers. The plurality of evaporation filters is arranged in a parallel arrangement. Each of the evaporation filters are in intimate contact with the water in the water reservoir so that each of the evaporation filters absorbs moister and becomes wetted. The container is placed in close proximity to the source of heated air so that the heated air flows into the tunnels and traverses the body of each of the evaporation filters that has been wetted and receives moisture therefrom, which is expelled into the room causing diffusion of moisture therewithin.

A method of using a humidifier is provided, including the step of placing a plurality of evaporation filters having an absorbing surface within one of a plurality of grooves arranged in a parallel arrangement located on the front and back walls of a container. Contemporaneously, the evaporation filters are placed within one of a plurality of support chambers located in an inner support portion fixedly attached within the container and being arranged within the container to form a water reservoir. The next steps involve filling the water reservoir with water and allowing the container to sit until the evaporation filters absorb the water, whereby the water travels along the surface of the evaporation filters and the evaporation filters become wetted. The last step involves placing the container in close proximity to a source of heated air.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention provides a humidifier and method of using same that is uncomplicated, having a minimal number of moving parts, and space and energy efficient. The diffusion humidifier of the present invention houses a plurality of evaporation filters in parallel alignment, facilitating the passage thereover of air from an air source in a floor or wall heating source. The humidifier affords an energy efficient construction that does not require a power source. A plurality of tunnels is provided between each evaporation filter in order to direct hot air flow from the heating source over each of the evaporation filters. These tunnels afford indirect air flow over the water reservoir so that direct evaporation from the water reservoir is mitigated, thereby decreasing the need and frequency of refilling of the reservoir.

Advantageously, the humidifier and method of using same does not require any moving parts necessitating the use of electricity, and is therefore extremely energy efficient. At the same time, the lack of moving parts provides further advantages, including silent operation, as there is no fan required, and very little maintenance. In addition, the need for humidity control sensors has been negated, as the humidifier automatically equilibrates the humidity of the room with that of the evaporation filters. As equilibrium is reached, evaporation of the moisture decreases; while at the same time, when the room air is drier, evaporation increases until equilibrium is achieved.

Figure 1A:
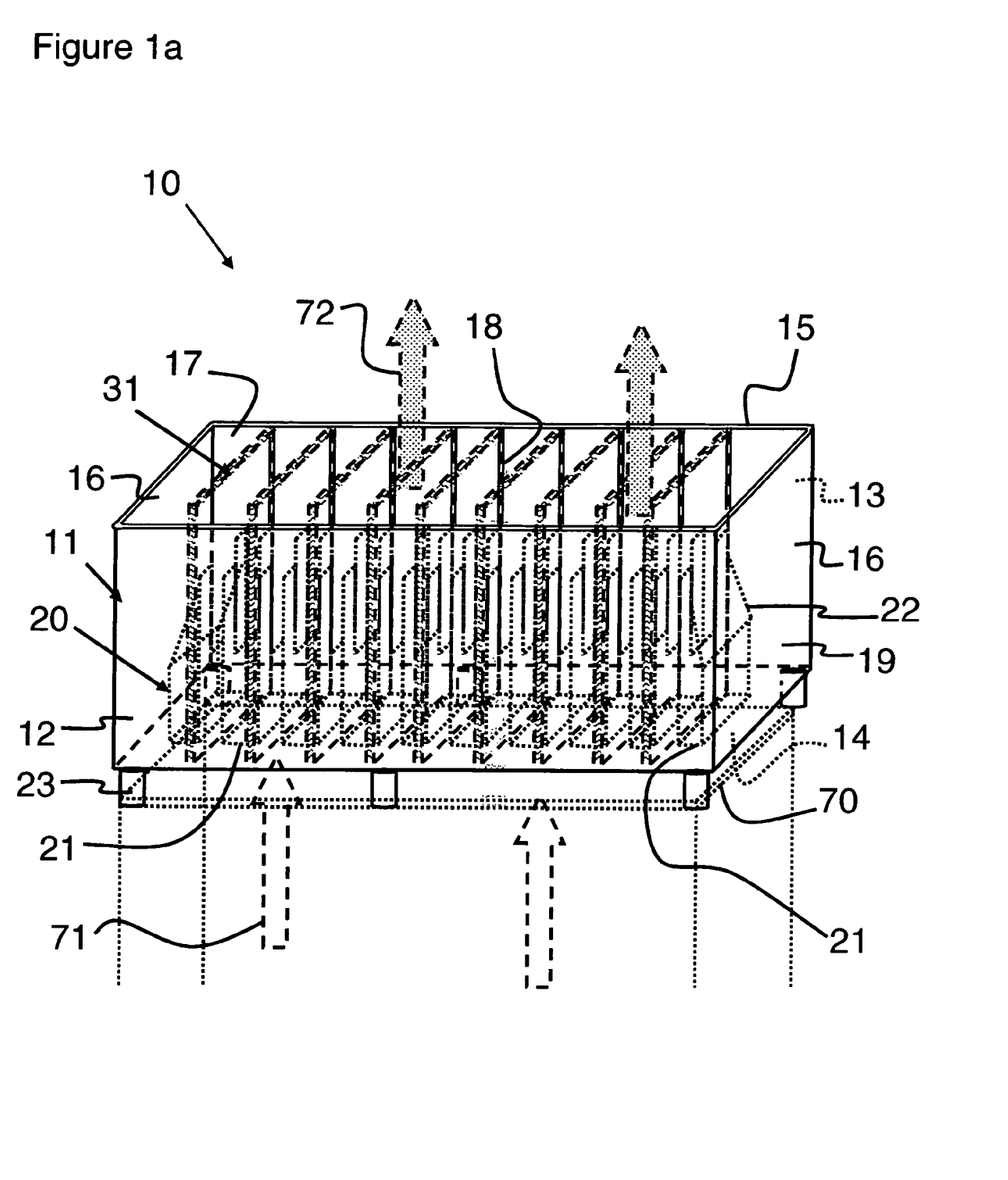
FIGS. 1a and 1b illustrate a front view of an embodiment of the humidifier for use with a source of heated air, the device being placed on a floor register, and an evaporation filter, respectively.
Figure 1B:
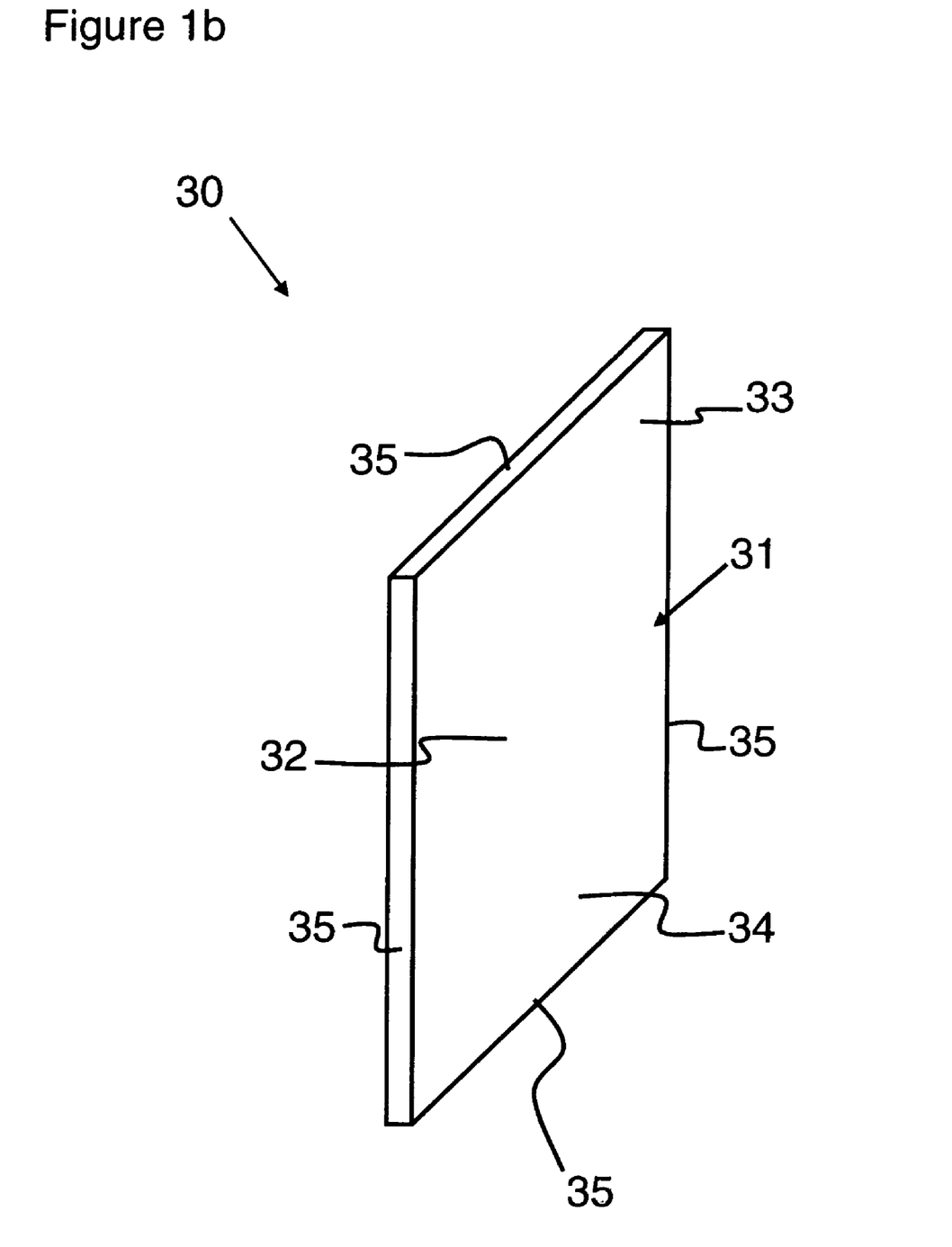

FIGS. 1a and 1b illustrate a front view of an embodiment of the humidifier for use with a source of heated air wherein the device is placed on a floor register, and a view of the evaporation filter. Specifically, FIG. 1a shows a front view of an embodiment of the humidifier for use with source of heated air wherein the device is placed on a floor register, shown generally at 10; and FIG. 1b shows the evaporation filter, shown generally at 30. The humidifier 10 comprises a container 11 having a front wall 12, back wall 13, bottom 14, top 15, and side walls 16, arranged to form an interior compartment 17. Container 11 is appointed to be placed in close association with a source of heated air, herein shown as a floor register 70 appointed to expel heated air 71 into a room. An inner support portion 20 is fixedly attached to bottom 14 of container 11. In this embodiment, inner support portion 20 is arranged to form a plurality of tunnels 21 and support chambers 22. The plurality of tunnels 21 extend from bottom 14 into interior compartment 17 of container 11 so that heated air from the source, herein floor register 70, enters tunnels 21 and traverses into the interior compartment 17 of container 11. Inner support portion 20 is arranged within container 11 to form a water reservoir 19 appointed to receive and house water. A plurality of grooves 18 are arranged in a parallel arrangement located on each of said front 12 and back 13 walls of container 11. Each of the grooves 18 is arranged in association with each of the support chambers 22 of inner support portion 20.

Continuing with FIG. 1, a plurality of evaporation filters 31 having lateral edges 35 and a body 32 with an upper portion 33 and a lower portion 34 are arranged in a parallel alignment within support chambers 22 of inner support portion 20 and vis-à-vie within container 11. At least two of the lateral edges 35 are received in at least two of the grooves 18 with one being on the front wall 12 and the other being on the back wall 13 of container 11. At least one of lateral edge 35 and lower portion 34 of body 32 of each evaporation filter 31 is substantially received in each support chamber 22 of inner support portion 20. Each lateral edge 35 and lower portion 34 of body 32 of each evaporation filter 31 is substantially in intimate contact with the water in water reservoir 19 so that each evaporation filter 31 absorbs moister and becomes wetted through capillary migration.

In operation, bottom 14 of container 11 appointed with tunnels 21 of inner support portion 20 is placed in close proximity to the source of heated air, floor register 70, so that heated air 71 flows into tunnels 21 and traverses body 32 of each of evaporation filter 31, which have been wetted through capillary migration so that moisture is absorbed onto each of the evaporation filters 31. Moisture from the evaporation filters 31 is evaporated into the heated air 71 as the heated air 71 passes over the wetted evaporation filters 31. As such, heated air 71 becomes humidified and humidified air 72 is expelled and diffused into the room. Optionally, the container 11 may further comprise a lid (not shown) removably attached and appointed to be received by top 17 of container 11. Preferably, the lid is hingedly attached to top 17 of container 11. In addition, the lid may comprise a plurality of apertures integrally constructed therein in order to diffuse moistened heated air 72 therefrom.

Container 11 generally has a rectangular shape, having a size that is appointed to substantially cover typical registers utilized by sources of heated air to traverse heated air into rooms. However, the humidifier can take on a vast array of shapes. Preferably, the humidifier 10 includes at least four support legs 23 attached to bottom 14 of container 11. Support legs 23 are spaced apart from one another and act to provide a clearance (vertical) between floor register 70 and bottom 14 of container 11, thereby channeling air efficiently into the tunnels 21. In addition, these support legs provide stability to the humidifier 11. Preferably, humidifier 11 comprises six support legs 23 to further enhance the durability and stability of the humidifier 11 as it is placed over the source of heated air.

When using the humidifier, a plurality of evaporation filters 31 having an absorbing surface are respectively placed within grooves 18, which are arranged in a parallel alignment located on front and back walls 12, 13 of container 11. In conjunction, each evaporation filter 31 is placed within each respective or associated support chamber 22 located in inner support portion 20 fixedly attached within container 11. Water is added to the water reservoir 19. The humidifier is allowed to sit until the evaporation filters 31 absorb the water and the water travels, via capillary migration, along the surface of the evaporation filters 31, thereby wetting same. More water is added to replenish the water reservoir 19 as needed, to top same off. The container is then placed in close proximity to a source of heated air so that the heated air traverses the evaporation filters 31 and moist air is diffused into the room.

Figure 2:
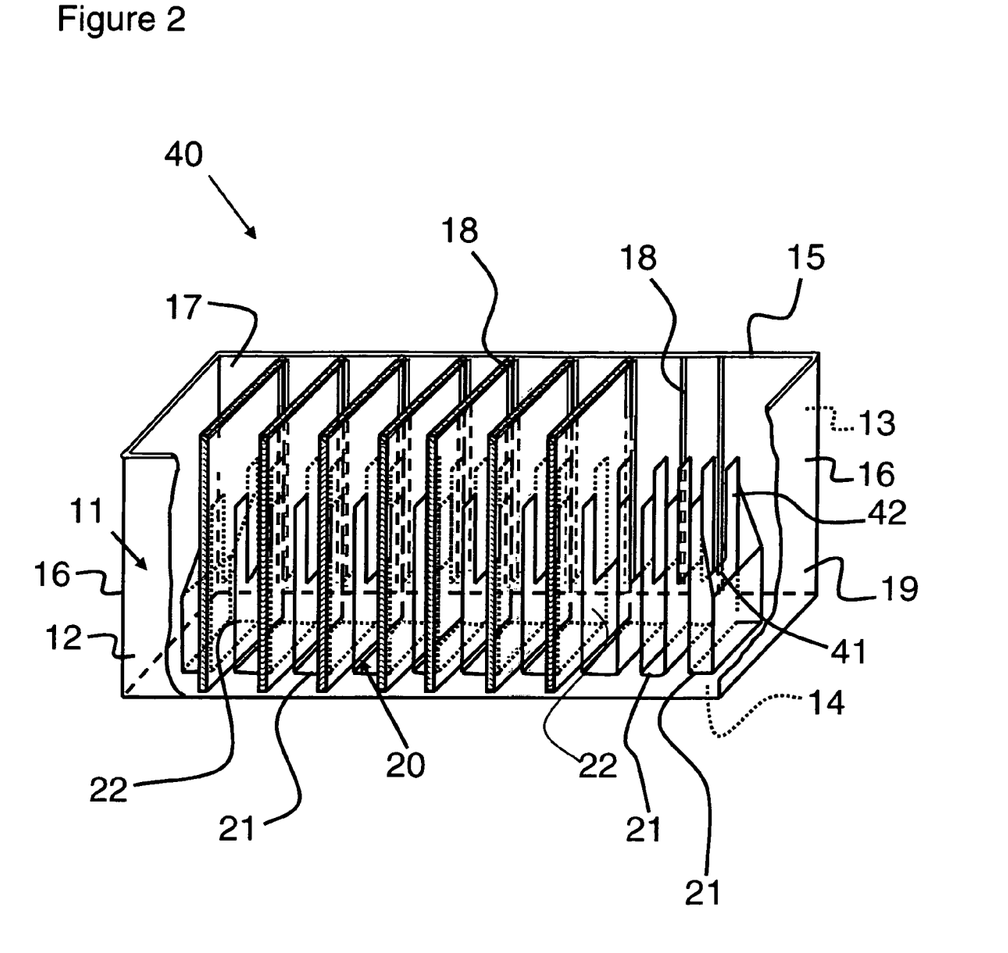
FIG. 2 illustrates a cut-away front view of the humidifier embodiment illustrated in FIG. 1, wherein the container is severed to further show the inner support portion and evaporation filters.

FIG. 2 illustrates a cut-away front view of the embodiment illustrated in FIG. 1, wherein the container is severed to further show the inner support portion and evaporation filters, shown generally at 40. Container 11 is shown with front wall 12 and a portion of one of side walls 16 cut away (and two evaporation filters 31 have been removed) in order to further illustrate inner support portion 20. Inner support portion 20 is fixedly attached to bottom 14 of container 11, and is arranged to form a plurality of tunnels 21 and support chambers 22 appointed for housing evaporation filters 31. In this embodiment, the plurality of tunnels 21 extend from bottom 14 into interior compartment 17 of container 11 so that heated air from the source, herein floor register 70, enters tunnels 21 and traverses into the interior compartment 17 of container 11. Inner support portion 20 is arranged within container 11 to form a water reservoir 19 appointed to receive and house water. A plurality of grooves 18 are arranged in a parallel arrangement located on each of the front 12 and back 13 walls of container 11. Each of the grooves 18 on front and back walls, 12 and 13, respectively, of container 11 are arranged in association with each of the support chambers 22 of inner support portion 20.

Continuing with FIG. 2, preferably each support chamber 22 has a u-shaped configuration (as is illustrated in FIGS. 1-5). As such, each support chamber 22 comprises a pair of brackets each having a center portion 41 and two vertical arms 42. Center portion 41 has a height less than the two vertical arms 42. Preferably, center portion 41 of each of the pair of brackets has a height ranging between 5 cm (1.97 inches) to 9 cm (3.54 inches). Most preferably, center portion 41 of each of the pair of brackets has a height of 7 cm (2.76 inches). The height of the center portion 41 is directly relevant to the level of the water or depth of water that can be held in the water reservoir 19. The greater the height of the center portion 41, the greater the depth the water retained in water reservoir 19, and vis-à-vis, the more water the reservoir 19 can hold and the less frequently same will need refilling by the user.

Figure 3A:
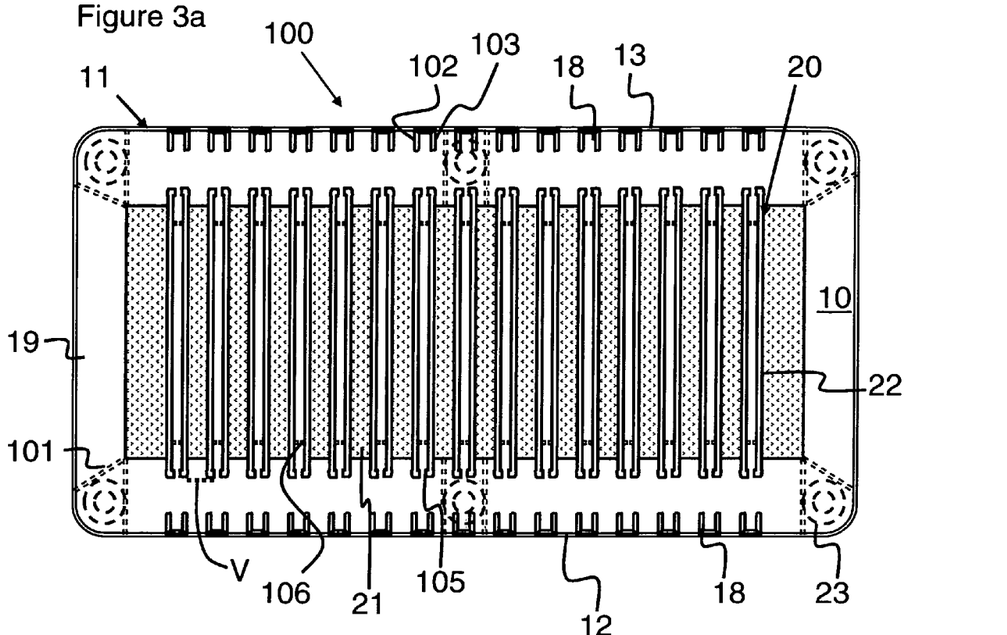
FIGS. 3a and 3b illustrate a top view and bottom view, respectively, of the humidifier embodiment illustrated in FIG. 1.
Figure 3B:
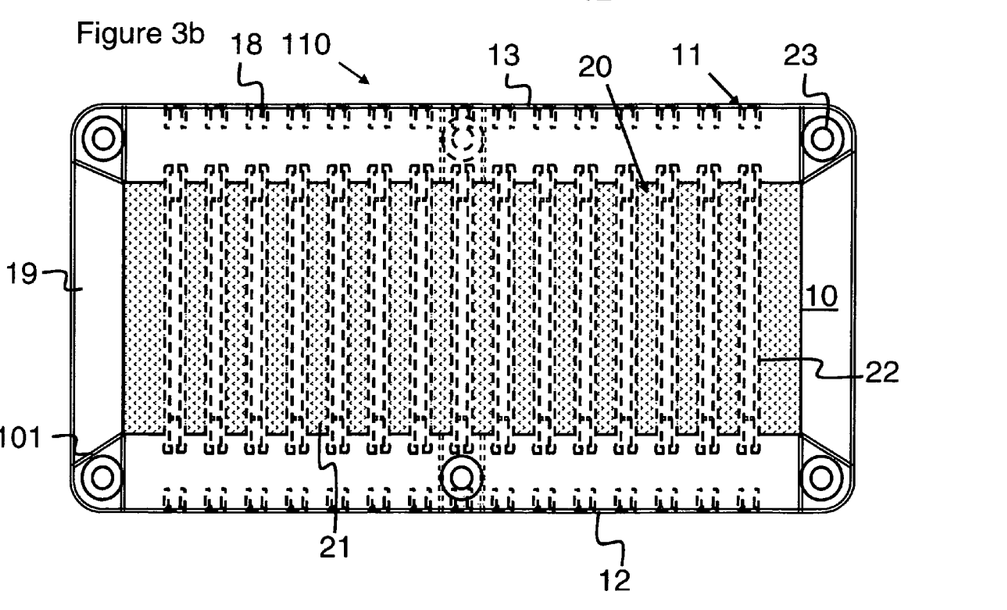

FIGS. 3a and 3b illustrate a top view and bottom view, respectively, of the humidifier embodiment illustrated in FIG. 1. In particular, FIG. 3a illustrates a top view of the humidifier embodiment illustrated in FIG. 1, shown generally at 100; and FIG. 3b illustrates a bottom view of the humidifier embodiment illustrated in FIG. 1, shown generally at 110. The humidifier 10 includes support legs 23. Support legs 23 may further include bid portions 101 to further support each of the support legs 23. The plurality of tunnels 21 are illustrated via shaded regions. Water reservoir 19 surrounds the outer edges of container 11 and travels into support chamber 22 of the inner support portion 20. Preferably, tunnels 21 have a width ranging from 0.5 cm (0.20 inches) to 1.5 cm (0.59 inches), as is indicated by V. More preferably, substantially all of the tunnels 21 have a width of 1 cm (0.39 inches) in width. The width of the tunnel plays a role in delivering maximum amount of heated air from the source of heated air, so that a substantial amount of the heated air enters the tunnels, and vis-à-vis the humidifier 10.

Continuing with FIGS. 3a and 3b, each support chamber 22 preferably has a thickness ranging from 0.17 cm (0.07 inches) to 0.6 cm (0.24 inches). In turn, each evaporation filter 31 (not shown in the figure) has a thickness ranging from 0.15 cm (0.59 inches) to 0.4 cm (0.16 inches). The thickness of the evaporation filter 31 and that of the support chamber 22 are closely related, so that the evaporation filters 31 are readily received and housed with each of the support chambers 22 in a manner is convenient for filter 31 replacement, yet at the same time offers snug stability so that the filters 31 do not jostle around or become freed from each of their respective support chambers 22. Alternatively, each support chamber 22 further comprises chamber tracks 105, 106 appointed for further stabilizing the evaporation filters 31. Preferably, each groove 18 is arranged in a parallel arrangement located on front and back walls, 12 and 13, respectively, of container 11. Each groove 18 comprises a groove pair, 102 and 103, wherein the distance between each groove pair, 102 and 103, ranges from 0.15 cm (0.59 inches) to 0.4 cm (0.16 inches). Each groove 18 is appointed to snuggly receive and house a lateral edge 35 of the evaporation filter 31 and work in conjunction with each relative support chamber 22 so that the filter 31 does not jostle or move around and become freed.

Figure 4:
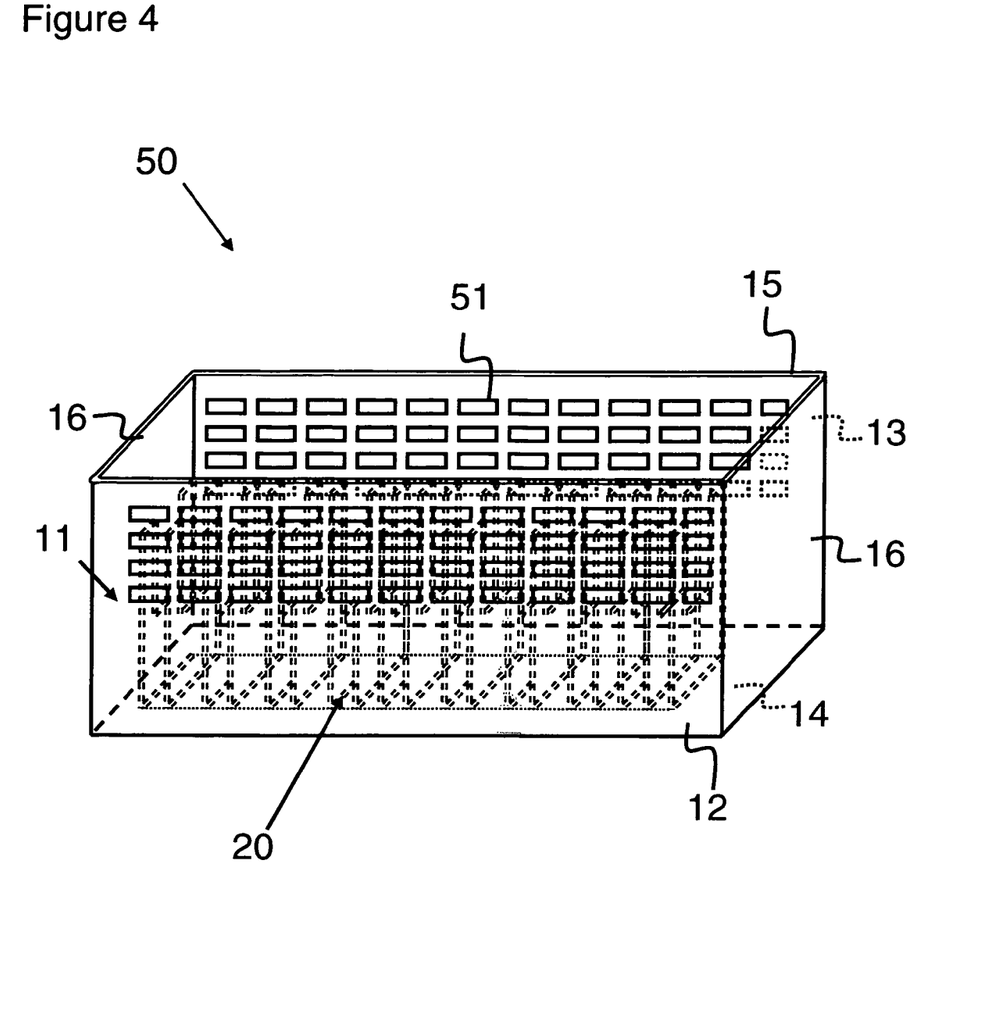
FIG. 4 illustrates a front view of the humidifier embodiment illustrated in FIG. 1, wherein the front and back walls of the container include a plurality of apertures therein.

FIG. 4 illustrates a front view of the humidifier embodiment illustrated in FIG. 1, wherein the front and back walls of the container include a plurality of apertures therein, shown generally at 50; Front and back walls, 12 and 13, of container 11 may further include a plurality of apertures 51 located therein. These apertures 51 are located above water reservoir 19, and vis-à-vis above the water level of the water reservoir 19 so as to prevent leakage of the water from the humidifier 10. These apertures facilitate enhanced diffusion of the moistened air as it exits the humidifier 10. In addition (although not illustrated in the figure) each of the side walls 16 of container 11 may further include a plurality of side wall apertures therein located above said water reservoir 19.

Figure 5A:
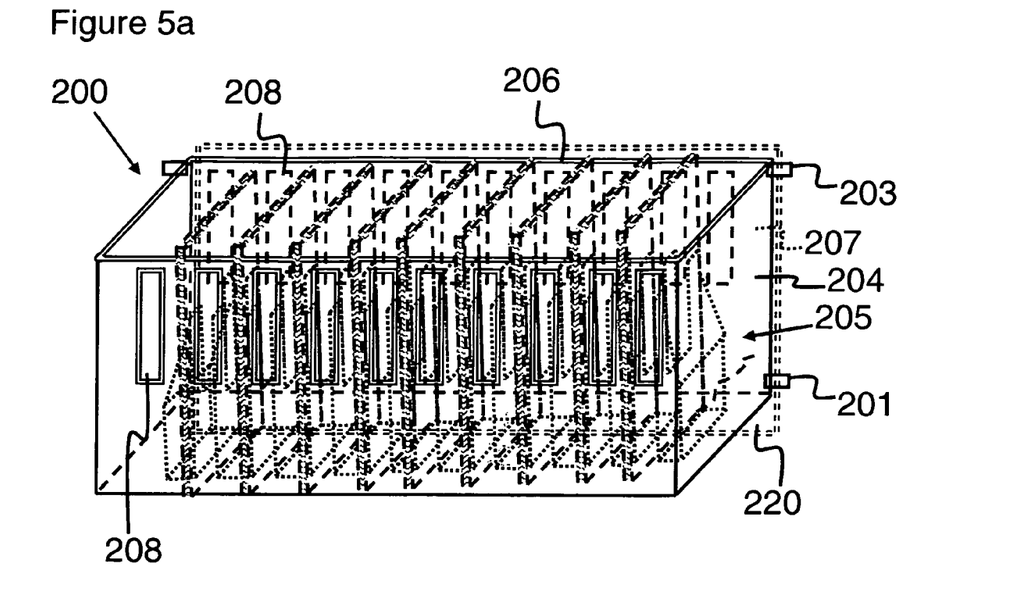
FIGS. 5a and 5b illustrate an embodiment of the humidifier for use with a source of heated air wherein the device is placed on a wall or base board register.
Figure 5B:
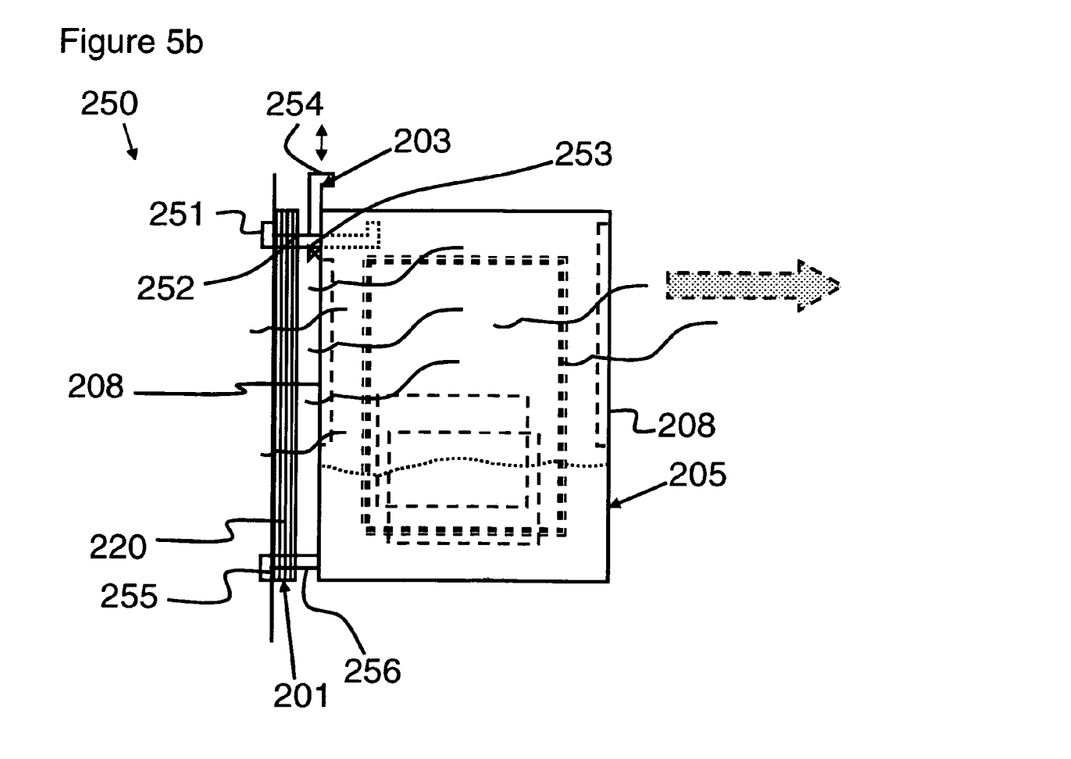
Figure 6:
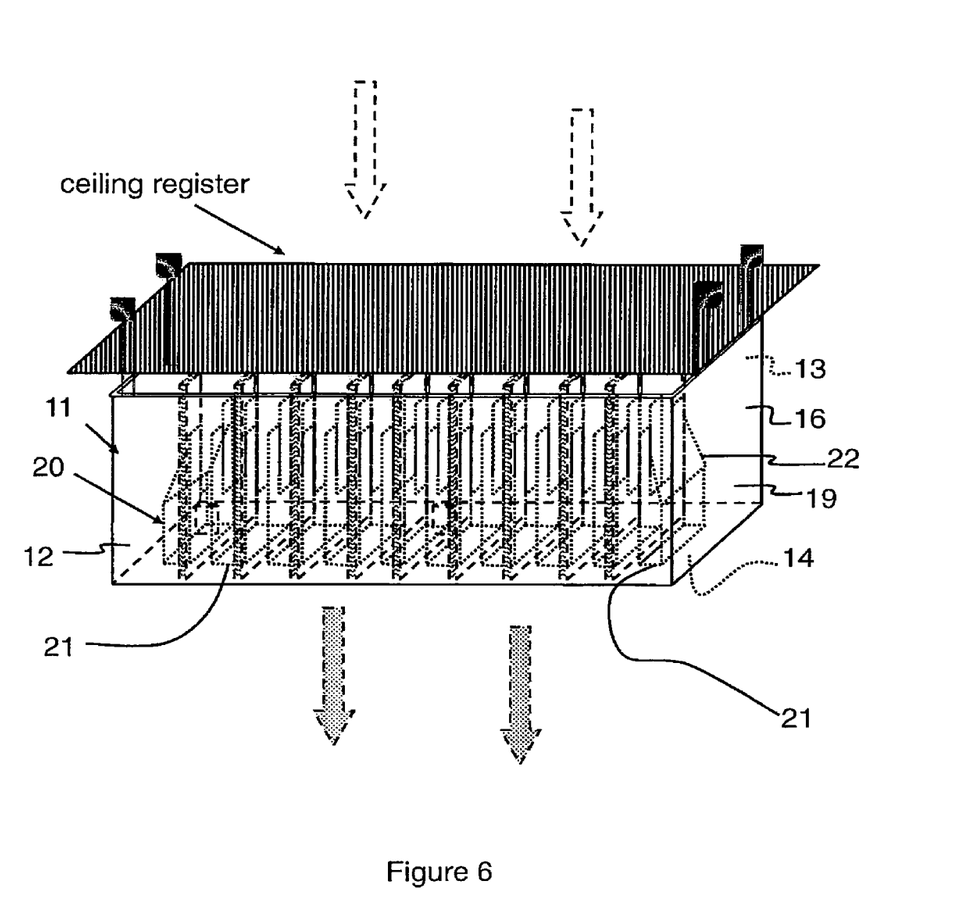
FIG. 6 illustrates a front view of an embodiment of a humidifier, in accordance with the present invention, for use with a source of heated air, where the humidifier hangs from a ceiling register.

FIGS. 5a and 5b illustrate an embodiment of the humidifier for use with source of heated air wherein the device is placed on a wall or base board register. In particular, FIG. 5a illustrates a front view of an embodiment of the humidifier placed on a wall register, shown generally at 200; and FIG. 5b illustrates a side view of an embodiment of the humidifier placed on a wall register illustrating the attachment to the register, shown generally at 250. The humidifier may be appointed to be placed on various sources of heated air, including floor registers (as shown in FIG. 1), ceiling registers, base board registers, and/or wall registers (as shown in FIGS. 5a and 5b).

Humidifier 200, 250 further comprises attachment means appointed to attach humidifier 200, 250 to a source of heated air, herein shown as a wall register 220. The attachment means, more clearly illustrated in FIG. 5b, may comprise at least two fixed latches 201 and at least two coil spring latches 203. The coil spring latches 203 include a foot 251 and a lever 252. Lever 252 is pivotally attached to pivot 253 which is in turn integrally connected to push knob 254 so that, when push knob 254 is pressed downward, lever 252 and foot 251 pivot or rotate 180 degrees back so that same are flush with side wall 207 of container 205 (as is shown via phantom lever 252 and foot 251). Fixed latches 201 are preferably located on the lower portion of the side walls 207 of container 205. In turn, coil spring latches 203 are preferably located on the top portion of the side walls 207 of container 205. Fixed latches 201 include a latch foot 255 and latch lever 256. The latches 201 and 203 are appointed to attach humidifier 200, 250 to the source of heated air, herein wall register 220. The latches 201 and 203 fit between grates within the register 220 and catch themselves either thereon or on the wall support of the register 220. Alternatively, the attachment means comprises at least two fixed mounts located on the top 206 of container 205, extending vertically upward (not shown in figure) and are appointed to attach the humidifier to a source of heated air, wherein the source of heated air comprises a ceiling register or ceiling vent.

Continuing with FIGS. 5a and 5b, humidifier 200, 250 further comprises a plurality of wall tunnels 208. These wall tunnels 208 allow heated air from the wall register 220 to flow into the wall tunnels 208 and traverse each evaporation filter 31, which have been wetted through capillary migration so that moisture is absorbed onto each of the evaporation filters 31. Moisture from the evaporation filters 31 is evaporated into the heated air as the heated air passes over the wetted evaporation filters 31. As such, the heated air becomes humidified and humidified air is expelled and diffused into the room. In another embodiment, there are no tunnels in the bottom of the container, but there are these wall tunnels 208 instead. This embodiment has particular applications when the humidifier is to be utilized for wall or base board mounting.

The humidifier may be composed of a polymeric or plastic material. As constructed, the humidifier preferably has a light-weight construction and is durable for extended use and can tolerate high levels of heat. Preferably, the polymeric material composing the humidifier includes a sterilizing chemical added within the polymeric material, thereby mitigating and preventing the growth of bacteria or collection of germs within the humidifier as it is being used for prolonged periods of time. Alternatively, each of the evaporation filters may be composed of a filter material containing an antibacterial agent in order to mitigate the growth of bacteria on the evaporation filters. Preferably, the filters are disposable, and can be readily replaced by the user.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A heated air humidifier comprising:
   a. a container having a front wall, back wall, bottom, top, and side walls, arranged to form an interior compartment, said container being appointed to be placed in close association with a source of heated air adapted to expel heated air into a room;
   b. an inner support portion fixedly attached to said bottom of said container and being arranged to form a plurality of tunnels and support chambers, the support chambers having a u-shaped configuration, said plurality of tunnels extending from said bottom into said interior compartment of said container;
   c. said inner support portion arranged within said container to form a water reservoir appointed to receive and house water;
   d. a plurality of grooves arranged in substantially parallel alignment and located on each of said front and back walls of said container, said grooves being associated, respectively, with said support chambers of said inner support portion; and e. a plurality of evaporation filters adapted to be received by said grooves and said support chambers of said inner support portion, said plurality of evaporation filters being arranged in a parallel arrangement, and each of said evaporation filters being in intimate contact with said water in said water reservoir so that each of said evaporation filters absorbs moisture and becomes wetted;

wherein said bottom of said container and said tunnels of said inner support portion are placed in close proximity to said source of heated air so that said heated air flows into said tunnels and traverses said body of said evaporation filters that have been wetted and receives moisture therefrom, which is expelled into said room so that moisture is diffused into said room, and wherein each of said support chambers having a u-shaped configuration comprises a pair of brackets each having a center portion and two vertical arms, wherein said center portion has a height less than said two vertical arms and wherein said center portion of each of said pair of brackets has a height ranging between 5 cm (1.97 inches) to 9 cm (3.54 inches).

2. A humidifier as recited by claim 1, wherein each of said grooves arranged in a parallel arrangement located on said front and back wall of said container comprise a groove pair wherein the distance between each of said grooves of said groove pair ranges from 0.15 cm (0.59 inches) to 0.4 cm (0.16 inches).

3. A humidifier as recited by claim 1, wherein each of said evaporation filters is composed of a filter material containing an antibacterial agent.

4. A humidifier as recited by claim 1, wherein each of said evaporation filters has a thickness ranging from 0.15 cm (0.59 inches) to 0.4 cm (0.16 inches).

5. A humidifier as recited by claim 1, wherein each of said support chambers has a thickness ranging from 0.17 cm (0.07 inches) to 0.6 cm (0.24 inches).

6. A humidifier as recited by claim 1, wherein said container further comprises a lid adapted to be received by said top of said container, wherein said lid comprises a plurality of apertures integrally constructed therein.

7. A humidifier as recited by claim 1, wherein each of said front and back walls of said container further includes a plurality of apertures therein located above said water reservoir.

8. A humidifier as recited by claim 1, wherein each of said side walls of said container further includes a plurality of side wall apertures therein located above said water reservoir.

9. A humidifier as recited by claim 1, wherein each of said evaporation filters is disposable.

10. A humidifier as recited by claim 1, wherein said container has a generally rectangular shape.

11. A humidifier as recited by claim 1, wherein said source of heated air comprises of a floor register and wherein said container is adapted to be placed upon said floor register.

12. A humidifier as recited by claim 11, wherein said bottom of said container further comprises at least four support legs spaced apart from one another to provide a clearance between said floor register and said bottom of said container.

13. A humidifier as recited by claim 1 further comprising attachment means for attaching said humidifier to said source of heated air.

14. A humidifier as recited by claim 13, wherein said attachment means comprises at least two fixed latches and at least two coil spring latches.

15. A humidifier as recited by claim 14, wherein said source of heated air comprises of a wall register.

16. A humidifier as recited by claim 15, comprising a plurality of wall tunnels located on said front and back of said container.

17. A humidifier as recited by claim 14, wherein said source of heated air comprises of a base board register.

18. A humidifier as recited by claim 17 comprising a plurality of wall tunnels located on said front and back of said container.

19. A humidifier as recited by claim 13, wherein said attachment means comprises at least two fixed mounts located on said top of said container for attaching said humidifier to said source of heated air, wherein said source of heated air comprises of a ceiling register or ceiling vent.

20. A humidifier as recited by claim 1, wherein said humidifier is composed of a polymeric material.

21. A humidifier as recited by claim 20, wherein said polymeric material composing said humidifier comprises a sterilizing chemical added within the polymeric material.

22. A humidifier as recited by claim 1, wherein each of said tunnels has a width ranging from 0.5 cm (0.20 inches) to 1.5 cm (0.59 inches).

23. A humidifier as recited by claim 1, wherein each of said support chambers further comprises chamber tracks for further stabilizing said evaporation filter.

* * * * *